United States Patent [19]

Gorbachev et al.

[11] Patent Number: 4,626,935
[45] Date of Patent: Dec. 2, 1986

[54] DEVICE FOR COUPLING CASSETTE TAPE RECORDER TO MICROCOMPUTER

[76] Inventors: Oleg S. Gorbachev, Zagrebsky bulvar, 5, korpus 3, kv. 272, Leningrad; Anatoly F. Ioffe, ulitsa 26 Bakinskikh komissarov, 7, korpus 4, kv. 59; Mikhail V. Kulagin, 5 Parkovaya ulitsa 39, korpus 2, kv. 10, both of Moscow; Boris I. Ruvinsky, ulitsa O.Dundicha 10, kv. 123; Vladimir S. Khorin, prospekt Raevskogo 6, kv. 17, both of Leningrad; Jury V. Chugunov, ulitsa Miklukho-Maklaya, 65, korpus 3, kv. 4, Moscow, all of U.S.S.R.

[21] Appl. No.: 691,214

[22] Filed: Jan. 14, 1985

[51] Int. Cl.[4] .............................................. G11B 31/00
[52] U.S. Cl. ........................................ 360/67; 360/46; 360/51
[58] Field of Search ........................ 360/48, 51, 46, 67

[56] References Cited

U.S. PATENT DOCUMENTS

| | | | |
|---|---|---|---|
| 4,363,040 | 12/1982 | Inose | 360/51 |
| 4,496,993 | 1/1985 | Sugiyama et al. | 360/48 |
| 4,528,601 | 7/1985 | Moriyama et al. | 360/46 |
| 4,564,870 | 1/1986 | Kitamura | 360/67 |

Primary Examiner—John S. Heyman
Attorney, Agent, or Firm—Lilling & Greenspan

[57] ABSTRACT

A device for coupling a cassette tape recorder to a microcomputer comprises several series-connected elements, such as a pulse shaper, a delay element, a flip-flop, a commutator whose another input is connected to an output of the pulse shaper, a reversible counter, and a shift register. The device, according to the invention, also comprises a counter whose one input is a clock input of the device, another input is connected to an output of the delay element, while an output is connected to a second input of the flip-flop, and a timer whose inputs are connected to the clock input of the device, to an output of the commutator, and to an output of the reversible counter and to a shift input of the shift register, respectively.

2 Claims, 12 Drawing Figures

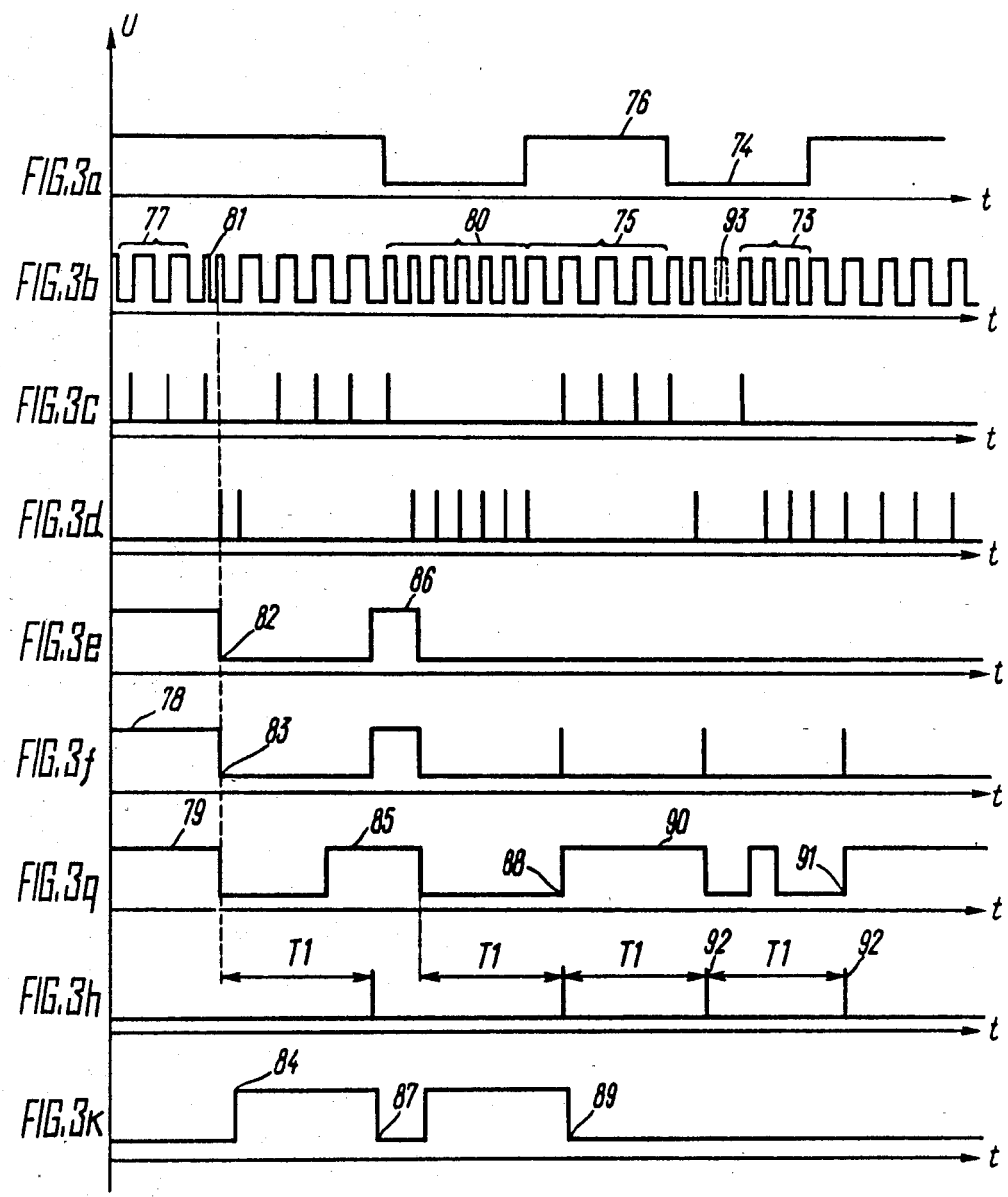

DEVICE FOR COUPLING CASSETTE TAPE RECORDER TO MICROCOMPUTER

BACKGROUND OF THE INVENTION
FIELD OF THE INVENTION

This invention relates to computers and is more particularly concerned with devices for coupling cassette tape recorders and microcomputers.

PRIOR ART

Cassette tape recorders ar often used in microprocessor systems as input-output devices and external memories since they possess a sufficient capacity, conveniently short fetching time and are inexpensive. But a cassette tape recorder requires a coupling device to be connected to the microcomputer interface. Information read off a magnetic tape is distorted, it differs substantially from the input signal, the amplitude is low, pulse leading edges are flat, some pulses can even be lost altogether. Information can be false due to noise. The coupling device, therefore, should correct the data, transform the serial presentation into a parallel one, which is more convenient for a computer.

Known in the art is a coupling device for a cassette tape recorder and a microcomputer (cf., for example, Elektronika magazine, No. 12, 1978, pp. 72–74, in Russian), comprising an input data bus, a pulse shaper, a flip-flop, a timer and an output data bus. Each leading and trailing edges of a pulse at the output of the pulse shaper start the time composed of two one-shot multivibrators which shape pulses and control the operation of the flip-flop producing a signal to be fed to the output data bus.

This coupling device is deficient in that it is not sufficiently reliable in reception of information since one-shot multivibrators used in the timer circuitry contain analog elements which are not stable when subjected to external influences, both electrical and climatic. Operating characteristics of such a coupling device are affected by the absence of a means to correct errors in the received signal, which are due to accidental noises, and a means for synchronization of the received bit for its subsequent writing into the shift register connected to the output data bus.

Also known in the art is a coupling device for a cassette tape recorder and a microprocessor, which comprises an input data bus, a pulse shaper, a delay element, a timer, a shift register, two flip-flops, and an output data bus (cf., for example, D. S. Zakharov, A. A. Klimashov, I. I. Cherkashin, Coupling Cassette Tape Recorder to Microprocessor System, Voprosy Atomnoi Nauki i Tekhniki, nuclear instrument series, Issue 3/41, Moscow, 1979, pp. 167–182, in Russian).

This couping device operates as follows: an input signal read off the magnetic tape is furnished to the input of a pulse shaper which generates pulses to fit the trailing and leading edges of the input signal. Shaped pulses are applied to the input of a timer composed of three one-shot multivibrators, two flip-flops, three delay elements and two counters. The timer produces control signals for two flip-flops and a sync signal for the shift register. The output of the shift register is joined to the output data bus of the coupling device.

This device is equipped with means for synchronization of the received bit to be entered to the shift register, but has no means for correcting errors in the received signal, caused by incidental noises. Moreover, the circuit of this coupling device comprises such insufficiently stable elements as one-shot multivibrators, which affects the information reliability of the device. One more disadvantage of this coupling device is that the circuit is overcomplicated.

And, finally, known in the art is a coupling device for a cassette tape recorder and a microcomputer (cf., for example, Designing Microcomputer Systems, U. W. Pooch and Rahul, Chattergy N.Y., 1979, Audio Cassette System, pp. 152–157), comprising several series-connected elements, such as a pulse shaper whose input is the information input of the coupling device, a delay element, a flip-flop, and a shift register whose output is the output of the coupling device. The coupling device also comprises a timer whose input is the clock input of the coupling device and whose output is connected to a shift input of the shift register.

The information signal read off the tape recorder is fed to the input of the timer, the clock input of the flip-flop, and to the input of the pulse shaper built around a one-shot multivibrator, which performs preliminary processing of the information fed from the tape recorder, whose code is usually redundant since each bit is coded by a series of pulses. The output signal of the pulse shaper is supplied, via a delay element, to the data input of the flip-flop, where the current decoded bit of input information is stored. The output of the flip-flop is coupled to the data input of the shift register. The timer comprises five flip-flops, a one-shot multivibrator, and an inverter. The timer produces pulses intended to clock the bits fed to the shift register whose output is coupled to the output data bus.

Though the circuitry of the proposed coupling device is rather simple and it is equipped with means for synchronization of bits, the reliability of the coupling device is still not high as far as reception of information is concerned. The coupling device comprises analog elements, like one-shot multivibrators, which are not sufficiently stable under the impact of external environment, both electrical and climatic. Moreover, this coupling device has no means to correct errors caused by random noises in the signal, which seriously reduces the information reliability of the device.

SUMMARY OF THE INVENTION

It is an object of this invention to increase the reliability of the coupling device for a cassette tape recorder and a microcomputer.

There is provided a coupling device for a cassette tape recorder and a microcomputer, comprising several series-connected units, such as a pulse shaper whose input is an information input of the coupling device, a delay element and a flip-flop, and also a shift register whose information input is coupled with the output of the flip-flop, while the output is the output of the coupling device, and a timer whose first output is connected to a shift input of the shift register, while a first input is the clock input of the coupling device, which, according to the invention, comprises a counter, a reversible counter and a commutator whose first input is connected to the output of the pulse shaper, the flip-flop being connected to the information input of the shift register via the commutator whose second input is connected to the output of the flip-flop and the reversible counter connected in series with the commutator and having its first input connected to the first output of said commutator, the second input of the reversible counter being connected to the second output of the commutator and to the second input of the timer, while the setting input of the reversible counter is connected with the second output of the timer whose third input is connected to an output of the reversible counter, and an output of the counter is connected to the second input of the flip-flop, a setting input of the counter is connected to the clock input of the coupling device and a resetting input of the counter is connected to an output of the delay element.

It is advisable that the timer should comprise three AND elements, three OR elements, one NOT element, two flip-flops, a counter, and a shift pulse shaper whose first input is a first input of the timer, a first input of the first AND element being a second input of the timer, while a second input of the shift pulse shaper is connected to an output of the first flip-flop whose first input is connected to an output of the first AND element, to a first input of the first OR element and to a first input of the second flip-flop whose output is connected to a first input of the second AND element and to a first input of the third AND element, a third input of the timer being connected to a second input of the second AND element whose third input is connected to an output of the shift pulse shaper, to a second input of the third AND element, to the counting input of the counter and to a first output of the timer, the output of the first OR element being a second output of the timer and connected to a second input of the shift pulse shaper, a reset input of the timer being connected to first inputs of the second and third OR elements whose outputs are connected, respectively, to second inputs of the first and second flip-flops, the output of the second AND element being connected to the input of the NOT element and to second inputs of the second and third OR elements, the output of the NOT element being connected to a third input of the third AND element whose output is connected, in turn, to the second input of the first OR element and to a third input of the third OR element, the output of the counter being connected to a third input of the second OR element.

A device for coupling a cassette tape recorder and a microcomputer, according to the invention, is characterized by a very high level of reliability since it contains no analog elements which are temperature dependent and unstable, therefore. All units are built around digital devices and it comprises a correction means for data reception errors, which is based on a commutator coupled with a reversible counter and a timer to control the former units.

BRIEF DESCRIPTION OF THE DRAWINGS

The invention will now be described in greater detail with reference to specific embodiments thereof, taken in conjunction with the accompanying drawings, wherein:

FIGS. 3 a, b, c, d, e, f, g, h, k show diagrams of signals in various points of the circuit of a coupling device according to the invention, where the signal voltage U is plotted on the ordinate and time t on the abscissa.

DETAILED DESCRIPTION OF THE PREFERRED EMBODIMENTS

Figure 1:
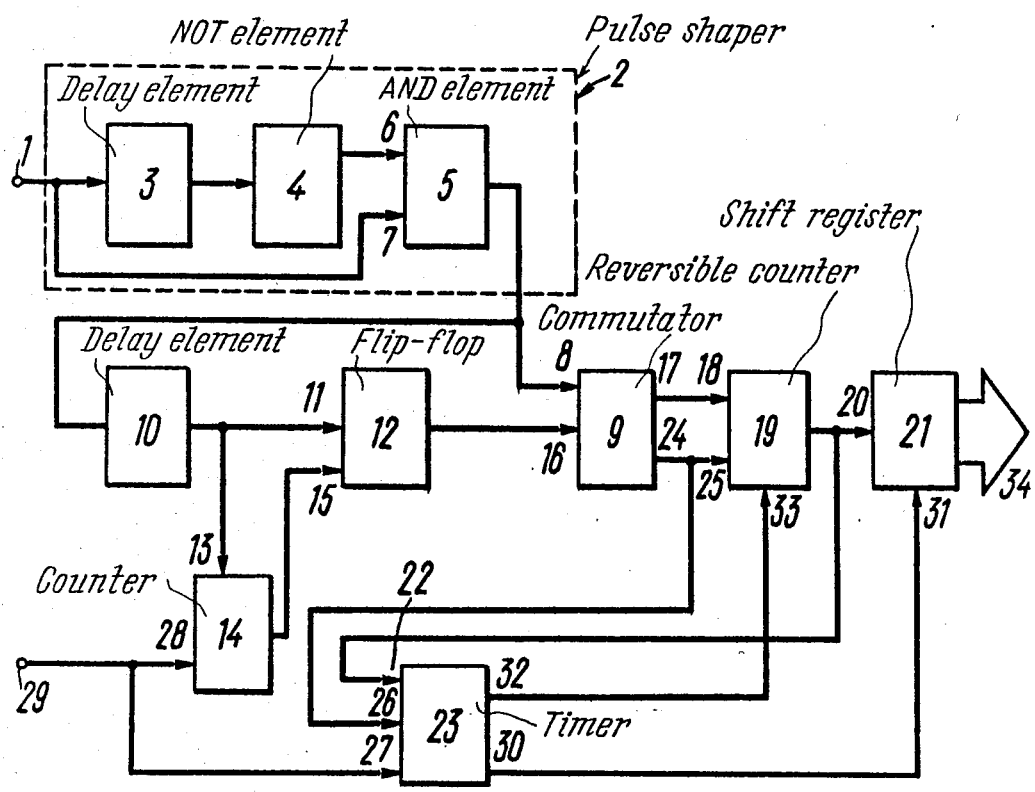
FIG. 1 shows a block diagram of a coupling device for a cassette tape recorder and a microcomputer, according to the invention.

A coupling device for a cassette tape recorder and a microcomputer of FIG. 1 comprises an information input 1 intended to be coupled to the output of a cassette tape recorder (not shown). This information input 1 is connected to a pulse shaper 2 which employs, for example, as shown in FIG. 1, several series-connected units, such as a delay element 3, a NOT element 4, and an AND element 5 whose one input 6 is connected to an output of the NOT element 4 and another input 7 which is the input of the pulse shaper 2 is connected to an input of the delay element 3. An output of the pulse shaper 2, which is the output of the AND element 5, is connected to an input 8 of a commutator 9 and to an input of a delay element 10 whose output, in turn, is connected to an input 11 of a flip-flop 12 and to a reset input 13 of a counter 14. The output of the counter 14 is connected to an input 15 of the flip-flop 12 whose output is connected to an input 16 of the commutator 9 whose output is connected to an input 18 of a reversible counter 19 whose output is connected to a data input 20 of a shift register 21 and an input 22 of a timer 23. An output 24 of the commutator 9 is connected to an input 25 of the reversible counter 19 and to an input 26 of the timer 23 whose input 27 is connected to a reset input 28 of the counter 14 and a clock input 29 of the coupling device. An output 30 of the timer 23 is connected to a shift input 31 of the shift register 21. An output 32 of the timer 23 is connected to a reset input 33 of the reversible counter 19. The output of the shift register 21 is the output 34 of the coupling device, which is intended to connect to a microcomputer (not shown).

Figure 2:
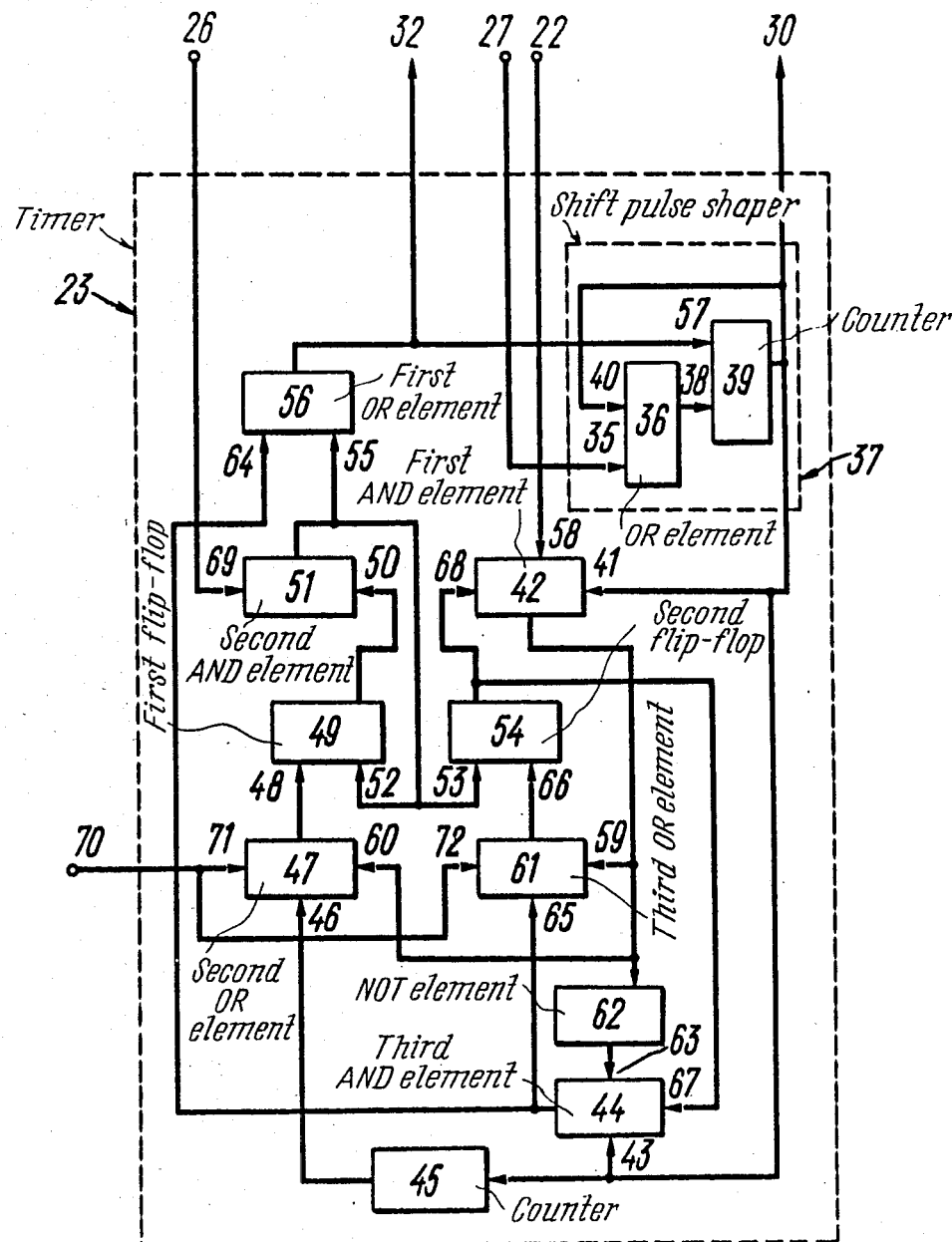
FIG. 2 shows a block diagram of one of the embodiments of a timer.

Referring to FIG. 2, a block diagram shows one of the possible embodiments of a timer 23 of the coupling device for a cassette tape recorder and a microcomputer according to the invention. The input 27 of the timer 23 is a first input 35 of an OR element 36 which is a part of a shift pulse shaper 37. An output of the OR element 36 is connected to a counting input 38 of a counter 39 which is also a part of the shift pulse shaper 37. An output of the counter 39 is the output 30 of the timer 23 and is connected to an input 40 of the OR element 36, to an input 41 of an AND element 42, to an input 43 of an AND element 44, and to an input of a counter 45 whose output is connected to an input 46 of an OR element 47 whose output is connected to an input 48 of a flip-flop 49. The output of the flip-flop 49 is connected to an input 50 of an AND element 51 whose output is connected to inputs 52 and 53 of flip-flops 49 and 54, respectively, and to an input 55 of an OR element 56 whose output is the output 32 of the timer 23 and is connected to a reset input 57 of the counter 39. The input 22 of the timer 23 is connected to an input 58 of the AND element 42 whose output is connected to inputs 59 and 60 of OR elements 61 and 47, respectively, and to an input of a NOT element 62 whose output is connected to an input 63 of the AND element 44. The output of the AND element 44 is connected to an input 64 of the OR element 56 and to an input 65 of the OR element 61 whose output is connected to an input 66 of the flip-flop 54 whose output, in turn, is connected to an input 67 of the AND element 44 and to an input 68 of the AND element 42. The input 26 of the timer 23 is connected to an input 69 of the AND element 51. A reset input 70 of the timer 23 is connected to inputs 71 and 72 of the OR elements 47 and 61, respectively. A reset signal is coupled to the input 70 when, for example, power is turned on.

The device for coupling a cassette tape recorder and a microcomputer, according to the invention, operates as follows.

Prior to reception of data but after the power is applied, a short pulse is coupled to the input 70 (FIG. 2) of the timer 23 to set the flip flop 54 to the 1 state and the flip-flop 49 to the 0 state. These states of the flip-flops 54 and 49 signify that the device is ready to receive the first synchronizing bit preceding the information bits of the coming message. Referring to FIG. 3a, it shows an information signal envelope, while FIG. 3b shows a frequency-modulated signal coupled from the output of the cassette tape recorder to the input 1 (FIG. 1) of the coupling device. In the frequency-modulated signal, a high modulating frequency, an information bit 73 (FIG. 3b), corresponds to a level 74 (FIG. 3a) of the logical zero of the information signal envelope, while a low modulating frequency, an information bit 75, corresponds to a level 76 (FIG. 3a) of the logical one. As the device receives the frequency-modulated signal, a train of narrow pulses is generated at the output of the pulse shaper 2 (FIG. 1), which are formed at the moment of arrival of the leading edge of the input signal.

From the output of the pulse shaper 2 pulses are delivered to the input 8 of the commutator 9 and to the input of the delay element 10. A delayed signal is taken from the output of the delay element 10 to the inputs 11 and 13 of the flip-flop 12 and counter 14, respectively.

As soon as the leading edge of the input signal arrives to the input 1, the flip-flop 12 is set to the 1 state, whereas the counter 14 is reset. The capacity of the counter 14 is selected so that the overflow time is equal to the arithmetic mean between the periods of the high and low frequencies employed to modulate the information zero and one. In this case, the carry pulse at the output of the counter 14, which is fed to the reset input 15 of the flip-flop 12, arrives before the next pulse of the modulating signal arrives to the input 1 if it is the low frequency signal representing the information "one". When a high frequency signal is applied to the input 1, which represents an information "zero", no carry pulse arrives to the output of the counter 14 since this counter 14 is constantly reset by the next pulse generated by the leading edge of the input signal.

When the flip-flop 12 is in the logical zero state, representing the low modulating frequency condition of the coupling device, at the instant of arrival of the pulse from the output of the shaper 2 to the input 8 of the commutator 9, the signal (FIG. 3c) produced at the output 17 of the commutator 9 is furnished to the summing input 18 (FIG. 1) of the reversible counter 19. And conversely, if the flip-flop 12 is in the logical one state, representing the high modulating frequency condition of the coupling device, the signal (FIG. 3d) produced at the output 24 of the commutator 9 is furnished to the subtracting input 25 (FIG. 1) of the reversible counter 19. If low frequency signals 77 (FIG. 3b) preceding the synchronizing bit are available at the output 1, the signal taken from the output 17 (FIG. 1) of the commutator 9 is supplied to the summing input 18 of the reversible counter 19. But the reversible counter 19 is blocked by a single 78 (FIG. 3f) of the coupling device, which is fed from the output 32 (FIG. 1) of the timer 23 to the setting input 33 of the reversible counter 19 and writes code $8_{10}$ into the counter 19 (having, for example, four bits), writes code $8_{10}$ into the reversible counter 19 having, for example, four bits, which means that a signal 79 (FIG. 3) corresponding to a logical one is present in the higher output order of the reversible counter 19.

If a spurious signal 81 (FIG. 3b) is applied, instead of the synchronizing bit 80 (FIG. 3b), to the input 1 (FIG. 1) of the coupling device, it passes through the commutator 9 (FIG. 1) and produces, at the subtracting input 25 of the reversible counter 19 and at the input 26 of the timer 23, a train of pulses, the first of which passes through the AND element 51 (FIG. 2) and resets the flip-flop 49 whose output signal 82 (FIG. 3e) prevents any subsequent pulses from passing through the AND element 51.

A logical zero signal taken from the output of the AND element 51 passes through the OR element 56 and produces a signal 83 (FIG. 3f) at the output 32 (FIG. 1) of the timer 23, which deletes the setting signal 78 (FIG. 3f) at the input 33 (FIG. 1) of the reversible counter 19 and, therefore, permits the counter 19 to operate.

Concurrently, a signal 84 (FIG. 3k) at the output of the AND element 51 (FIG. 2) switches the flip-flop 54 (FIG. 2) to the "one" state and the signal at the output of the OR elements 56 is coupled to the reset input 57 of the counter 39 which is a part of the shift pulse shaper 37 generating, at the output thereof (output 30 of the timer 23), unit pulses which determine the bit duration intervals $T_1$ (FIG. 3h). If the spurious signal 81 (FIG. 3b) is applied to the input 1 (FIG. 1) of the coupling device, and this signal 81 is as a rule shorter than the true synchronizing bit 80, a logical one signal 85 (FIG. 3g) is produced, at the end of the bit duration interval $T_1$ (FIG. 3h), at the output of the reversible counter 19 (FIG. 1) because said reversible counter 19 (FIG. 1) counts more summing than subtracting pulses. The signal 85 (FIG. 3g) representing a logical one level is transmitted from the output of the reversible counter 19 to the AND element 42 (FIG. 2) and produces, at the output thereof, a pulse which is an error flag. This pulse is passed through the OR elements 47 and 61 and sets a logical one signal 86 (FIG. 3e) at the output of the flip-flop 49 and a logical zero signal 87 (FIG. 3l) at the output of the flip-flop 54. In summary, the coupling device detects a spurious signal which can be mistaken for a synchronizing bit and gets ready to receive a true synchronizing bit.

If the synchronizing bit 80 (FIG. 3b) is correctly identified by the coupling device, a logical zero signal 88 (FIG. 3g) is produced at the output of the reversible counter 19 during the bit duration interval $T_1$. This signal 88 is transmitted through the AND element 42 (FIG. 2), the NOT element 62, the AND element 44, and the OR element 61 and sets the logical one level 89 (FIG. 3b) at the output of the flip-flop 54 (FIG. 2) thus preventing further travel of the signal through the AND element 42.

In summary, the error protection circuit is disconnected when a true synchronization bit is identified.

In the process of reception of the information bits 75 and 73 (FIG. 3b), respective signals 90 and 91 (FIG. 3g) at the output of the reversible counter 19 (FIG. 1) are delivered to the information input 20 of the shift register 21, while signals 92 (FIG. 3h) at the output 30 (FIG. 1) of the timer 23 are delivered to the shift input 31 of the shift register 21, thus resulting in bit-by-bit (or digit-by-digit) reception of information by the shift register 21. An error signal (FIG. 3b) due to the loss of an information modulating pulse is integrated in the reversible counter 19 (FIG. 1).

The number of information bits received is registered in the counter 45 (FIG. 2).

The end of reception of information bits 73 and 75 comes when all information bits of the shift register 21 (FIG. 1) and the carry pulse at the output of the counter 45 (FIG. 2) gets the coupling device ready to receive a new synchronizing bit.

What is claimed is:

1. A device for coupling a cassette tape recorder and a microcomputer, comprising:

a pulse shaper having an input and an output;

said input of said pulse shaper, which is an information input of the device;

a delay element having an input and an output, said input being connected to said output of said pulse shaper;

a flip-flop having a first input, a second input and an output, said first input being connected to said output of said delay element;

a commutator having a first input, a second input, a first output, and a second output, said first input being connected to said output of said pulse shaper, and said second input being connected to said output of said flip-flop;

a reversible counter having a first input and a second input being connected, respectively, to said first and second outputs of said commutator, and a third input, and an output;

a shift register having a first input connected to said output of said reversible counter, a second input, and an output which is an output of said device;

a counter having a first reset input connected to said output of said delay element, a second counting input which is a clock input of said device, and an output connected to said second input of said flip-flop;

a timer having a first input connected to said output of said reversible counter, a second input connected to said second output of said commutator, a third input joined with said clock input of said device, a first output connected to said third setting input of said reversible counter, and a second output connected to said second shift input of said shift register.

2. A device for coupling a cassette tape recorder to a microcomputer as claimed in claim 1, wherein said timer comprises:

an AND element having a first input which is said first iput of said timer, a second input, a third input, and an output;

a second AND element having a first input which is said second input of said timer, a second input, and an output;

a shift pulse shaper having an input which is said third input of said timer, and an output which is said second output of said timer and is connected to said second input of said first AND element;

a first OR element having a first input connected to said output of said second AND element, a second input, and an output which is said first output of said timer;

a flip-flop having a first input connected to said output of said second AND element, a second input, and an output connected to said second input of said second AND element;

a second flip-flop having a first input connected to said output of said second AND element, a second input, and an output connected to said third input of said first and element;

a second OR element having a first input which is a reset input of said timer, a second input connected to said output of said first AND element, a third input, and an output connected to said second input of said first flip-flop;

a third OR element having a first input joined with said first input of said second OR element, a second input connected to said output of said first AND element, a third input, and an output connected to said second input of said second flip-flop;

a NOT element having an input connected to said output of said first AND element, and an output;

a third AND element having a first input connected to said output of said NOT element, a second input connected to said output of said second flip-flop, a third input connected to said output of said shift pulse shaper, and an output connected to said third input of said third OR element and to said second input of said first OR element;

a counter having an input connected to said output of said shift pulse shaper, and an output connected to said third input of said second OR element.

* * * * *